Patented Jan. 15, 1935

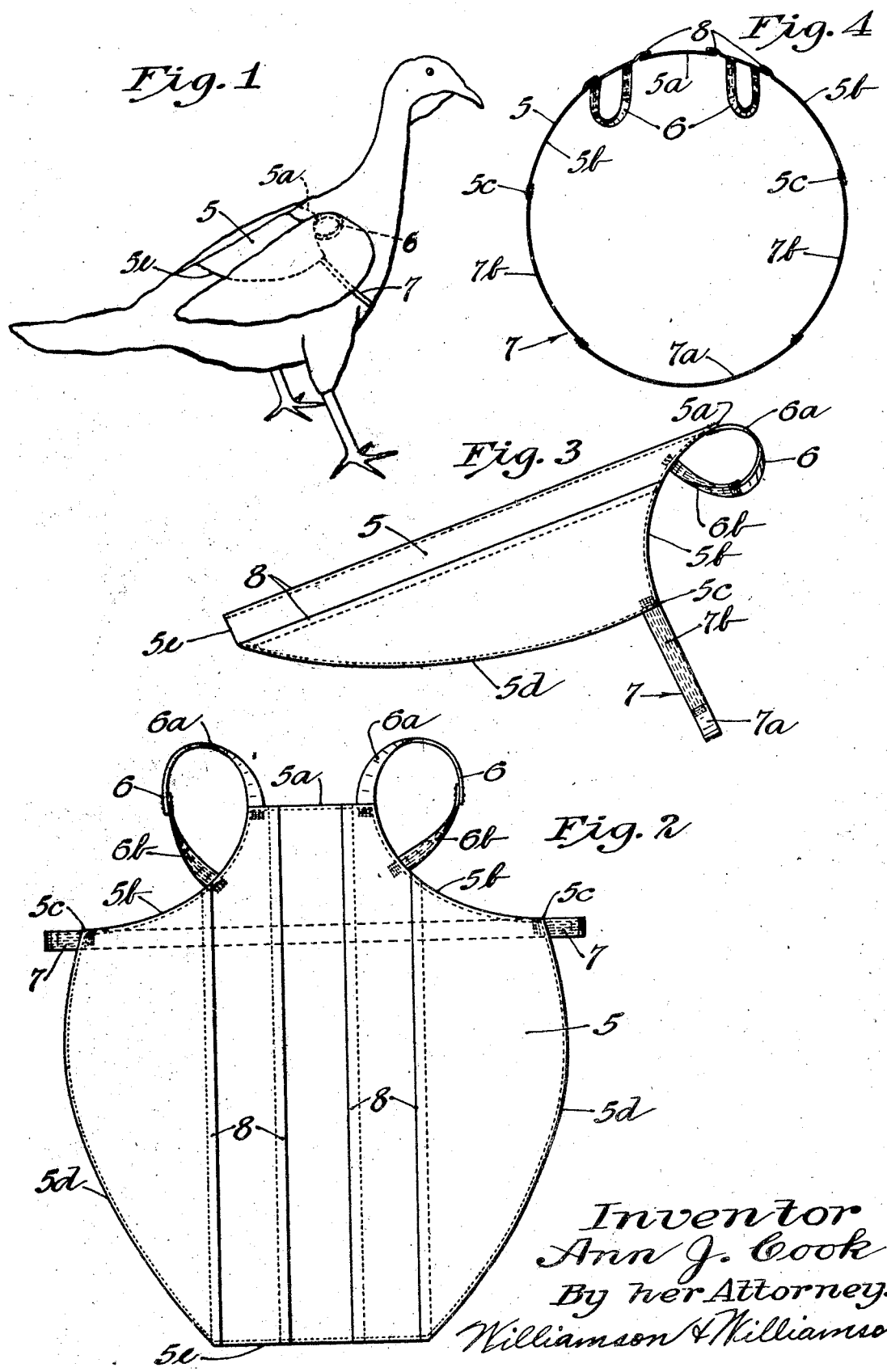

1,987,818

UNITED STATES PATENT OFFICE 1,987,818

BREEDING SADDLE APRON FOR TURKEYS

Ann J. Cook, Northfield, Minn.

Application July 20, 1934, Serial No. 736,191

9 Claims. (Cl. 119—143)

My invention relates to protective coverings for fowls and particularly to protective coverings for the upper sides of the bodies of hen turkeys.

Domesticated turkeys which are fattened for the market are much heavier than turkeys in their wild or natural state and have skin and flesh which is much softer and much less resistant to injury. During the breeding season many hen turkeys have the skin and flesh of the upper side of the body torn and mutilated by the claws of the tom turkeys. Such injury occurs when the tom turkey loses his normal grip on the bases of the hen's wings and, either in slipping or in seeking a new grip, slashes the hen's back with his claws. Hens having mutilated or scarred bodies naturally bring a much lower price in the market and hence the above described damage to the birds results in great losses to turkey raisers.

It is desirable that protective coverings for the upper sides of the bodies of hen turkeys be provided so as to prevent the damage described above. While coverings intended for this purpose have been produced, no entirely satisfactory device of the kind has been heretofore evolved. Such a device, to be successful, must be so designed that the major part thereof is concealed from the view of the bird upon which it is placed and this has not been done. When a sufficiently noticeable portion of such a device is exposed to the view of the bird, the bird will be irritated thereby and will continually peck at the device and normal development of the bird will be retarded.

An object of my invention is to provide a breeding saddle apron which, when placed upon a turkey, will be almost entirely hidden from the view of the bird.

Another object is to provide such an apron wherein no part thereof of appreciable size is positioned forwardly of the wings of the bird to which it is applied, wherein the device is almost entirely concealed by the wings of the bird and wherein attachment tapes are concealed by the plumage of the bird.

Still another object is to provide means in such a device for aiding a tom turkey in obtaining a foothold.

These and other objects and advantages of the invention will more fully appear from the following description made in connection with the accompanying drawing, wherein like reference characters refer to the same or similar parts throughout the various views, and in which:—

Fig. 1 is a view of a turkey on which my device is applied;

Fig. 2 is a view of my device as it appears when spread out flat;

Fig. 3 is a side view of my device when the same is curved to assume the attitude in which it is disposed when in place on a turkey, and Fig. 4 is a front end view when the device is curved to assume the attitude in which it is disposed when in place on a turkey.

Referring to the drawing, my breeding saddle apron is formed of flexible material such as canvas or other suitable material and may or may not be colored to resemble the color of a turkey's plumage as may be desired.

The forward edge 5a of the body or covering member 5 comprised in my device is intended to extend between points closely adjacent the bases of the respective wings of a turkey and is made relatively short. From the respective ends of the forward edge 5a the forward portions 5b of the respective side edges of the covering curve divergingly rearwardly and outwardly to respective points 5c, symmetrically located relative to the covering 5 and spaced apart a considerably greater distance than the respective ends of the forward edge 5a.

From the points 5c the side edge portions 5d of the covering 5 first extend rearwardly and slightly outwardly and then curve convergently rearwardly and inwardly to meet the respective ends of the rear edge 5e. The respective ends of the rear edge 5e are spaced apart by a distance somewhat greater than the distance between the respective ends of the forward edge 5a and considerably less than the distance between respective ones of the points 5c. The forward and rearward edges 5a and 5e of the covering 5 are disposed along straight parallel lines respectively extending transversely of the covering 5.

Suitable means is provided for attaching the covering 5 to the body of a turkey including bands for encircling the bases of the respective wings and a band for extension across the breast of the bird. Each wing engaging band 6 consists of a strip 6a of non-elastic flexible material secured at one end to the corner of the covering 5 formed at the junction of the forward edge 5a and the adjoining portion 5b of the side edge and connected at its other end to one end of a strip 6b of flexible, elastic material. The remaining end of the elastic strip 6b is secured to the covering 5 at a point medial of the curved portion 5b of the side edge of the covering 5 as shown.

The breast engaging band 7 consists in its medial portion of a non-elastic flexible strip 7a to each end of which is secured one end of a respective one of a pair of elastic, flexible strips 7b. The remaining end of each elastic strip 7b is secured to the cover 5 at one of the respective points 5c previously described.

It is to be noted that each side portion of the covering 5 lying between the point of attachment of the elastic strip 6b to the covering 5, the point 5c and the junction of the rear edge 5e with the portion 5d of the side edge of the covering 5 is shaped similarly to the shape of a turkey's wing but is somewhat smaller whereby this wing-shaped portion of the covering may be concealed between a wing and the body of a turkey.

Pleats 8, to assist a tom turkey in securing a foothold on the covering 5, are formed on the covering 5 in longitudinally extending relation thereto and in spaced parallel relation to each other.

In applying my device to a turkey the bands or loops 6 are slipped over the respective wings and are positioned to encircle the bases of the wings. The elastic strip 6b forming part of each loop 6 causes the loop to gently grip the base of the wing. The band 7 is positioned to extend across the breast of the bird and because of the elastic portions 7b thereof firmly holds down the wing-shaped side portions of the covering 5 and holds the medial portion of the covering 5 in place on the upper side of the body of the bird.

The bands 6 and 7 sink into and are overlapped by the plumage of the bird and are hence concealed. The wing-shaped side portions of the covering are disposed between the wings and the body of the bird and are hence concealed by the wings as shown in Fig. 1. The only part of the device remaining unconcealed is a narrow portion of the covering 5 disposed along and adjacent to the longitudinal center line of the device. It has been found that this remaining unconcealed portion is sufficiently small and inconspicuous and is so located that the turkey to which the device is applied pays no attention to the same. This small unconcealed portion may be made still less conspicuous by suitably coloring the same to approximately blend with the color of the particular breed of turkeys with which the device is to be used.

The covering 5 is hemmed or otherwise bound along its entire periphery partially to improve the appearance thereof and partially to prevent tearing or fraying.

While my breeding saddle apron has been illustrated and described as for use in connection with turkeys it is obvious that it may be readily adapted for use in connection with many other types of birds.

It is apparent that I have invented a novel, simple, inexpensive and effective form of breeding saddle apron for turkeys and the like which is almost entirely concealed by portions of the bird to which it is applied and which in no way annoys or irritates the bird to which it is applied.

It will, of course, be understood that various changes may be made in the form, details, proportions and arrangement of the parts, without departing from the scope of my invention, which, generally stated, consists in a device capable of carrying out the objects above set forth and in the novel parts and combinations of parts disclosed and defined in the appended claims.

What is claimed is:—

1. A protective apron for fowls comprising a covering adapted to be placed upon the upper side of the body of a fowl, said covering having a relatively narrow longitudinal center portion extending rearwardly from a line extending between the bases of the wings of said fowl and side portions extending laterally of said center portion, said side portions having length and width dimensions less than the length and width dimensions of said fowl whereby said side portions will be concealed by the wings of said fowl when said wings are in normal position against the body of said fowl.

2. A protective apron for fowls comprising a covering adapted to be placed upon the upper side of the body of a fowl, said covering terminating at its forward end at the base of the wings of said fowl and at its rearward end somewhat short of the tips of said wings, said covering having a relatively narrow longitudinal central portion and side portions extending laterally outwardly from said central portion, said side portions each having a shape similar to that of the wing of a fowl but being somewhat smaller in dimensions and means for securing said covering to said fowl whereby said side portions, when disposed between the body and wings of said fowl, are concealed by said wings.

3. A protective apron for fowls comprising a covering adapted to be placed upon the upper side of the body of a fowl, said covering having a relatively narrow longitudinal center portion extending rearwardly from a line extending between the bases of the wings of said fowl to a point rearwardly disposed therefrom but forward of the tips of said wings and side portions extending laterally of said center portion, said side portions each having a shape generally similar to that of a wing of said fowl but being somewhat smaller in dimensions, whereby said side portions, when extending between the body and wings of said fowl, are concealed by said wings, and narrow flexible bands secured to the forward portion of said covering and forming loops for encircling the bases of the respective wings, said bands being adapted to sink into and be concealed by the plumage of said fowl.

4. A protective apron for fowls comprising a covering adapted to be placed upon the upper side of the body of a fowl, said covering having a relatively narrow longitudinal center portion extending rearwardly from a line extending between the bases of the wings of said fowl to a point rearwardly disposed therefrom but forward of the tips of said wings, side portions extending laterally of said center portion, said side portions each having a shape generally similar to that of a wing of said fowl but being somewhat smaller in dimensions, whereby said side portions, when disposed between the body and wings of said fowl, are concealed by said wings, narrow flexible bands secured to the forward portion of said covering and forming loops for encircling the bases of the respective wings and a third narrow flexible band attached at its respective ends to said side portions to extend across the breast of said fowl, said bands all being adapted to sink into and be concealed by the plumage of said fowl.

5. A protective apron for fowls comprising a protective covering formed of flexible material and adapted to be placed upon the back of a fowl, the forward end of said covering being adapted to extend between the bases of the respective wings of said fowl and being relatively narrow, the edges of said covering curving divergently rearwardly from the forward end thereof to the medial portion thereof, said medial portion being of a width whereby the sidewardly extending parts thereof will extend at each side thereof between the body and a wing of said fowl to be concealed by said wing, said covering curving convergently inwardly toward the rear and the rearmost portion thereof being relatively narrow, an attachment loop adapted for encircling the base of a wing and attached to said covering adjacent each end of the forward edge thereof and an attachment strip adapted to extend across the breast of said fowl attached at opposite ends to the respective side edges of the medial portion of said covering, said attachment loops and said attachment strip being adapted to sink into and be concealed by the plumage of said fowl.

6. A protective apron for female fowls comprising a covering formed of flexible material and adapted to be placed upon the upper side of the body of a fowl, means for securing said covering to said fowl and pleats formed in portions of said covering to provide a foothold for a male fowl.

7. A protective apron for female fowls comprising a covering formed of flexible material and adapted to be placed upon the upper side of the body of a fowl, said covering including a relatively narrow center portion extending longitudinally rearwardly of said fowl from adjacent the bases of the wings of said fowl, pleats formed in said center portion and extending longitudinally thereof to provide a foothold for a male fowl and means for securing said covering to said female fowl.

8. A protective apron for female fowls comprising a covering formed of flexible material and adapted to be placed upon the upper side of the body of a fowl, said covering having a relatively narrow longitudinal center portion extending rearwardly from a point substantially aligned with the bases of the wings of said fowl and side portions extending laterally of said center portion, pleats formed in said center portion and extending longitudinally thereof to provide a foothold for a male fowl and means for securing said covering to the body of said female fowl.

9. A protective apron for female fowls comprising a covering formed of flexible material and adapted to be placed upon the upper side of the body of said fowl, means for securing said covering to said fowl, said covering including a relatively narrow center portion extending rearwardly with respect to said fowl from adjacent the bases of the wings of said fowl and side portions extending laterally from respective sides of said center portion, and a series of spaced parallel pleats formed in said center portion and extending longitudinally thereof to provide a foothold for a male fowl.

ANN J. COOK.